Aug. 14, 1928.
C. T. MASON
1,680,465
ELECTRICAL MEASURING INSTRUMENT
Filed July 18, 1925
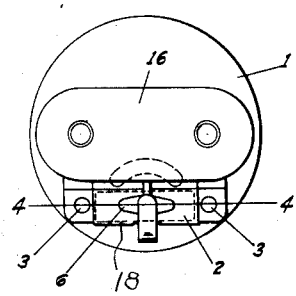
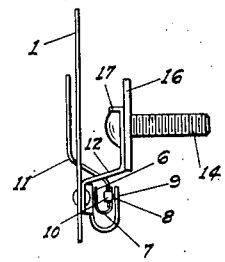
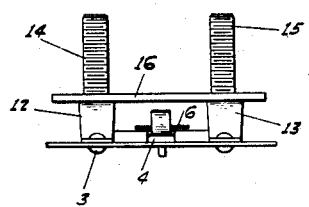
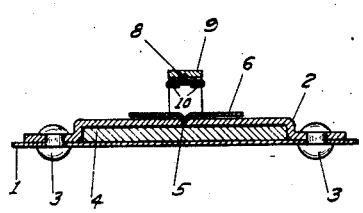
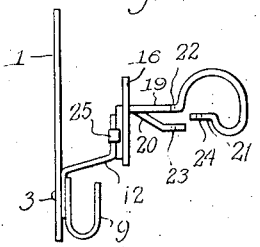
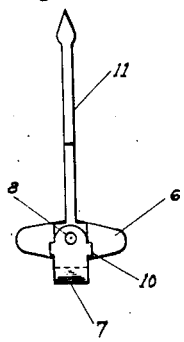
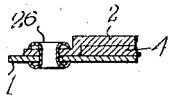
INVENTOR
CARL T. MASON
BY
A. D. T. Libby
ATTORNEY Patented Aug. 14, 1928.

1,680,465

UNITED STATES PATENT OFFICE.

CARL T. MASON, OF EAST ORANGE, NEW JERSEY, ASSIGNOR TO TIFFANY MANUFACTURING CO., OF NEWARK, NEW JERSEY.

ELECTRICAL MEASURING INSTRUMENT.

Application filed July 18, 1925. Serial No. 44,497.

This invention relates to improvements in an electrical measuring instrument, particularly, of the type for measuring the flow of electrical current.

One of the objects of my invention is to provide an instrument which will consist of a minimum number of parts thereby aiding in reducing the cost of construction, at the same time providing a meter which is relatively sturdy in its construction and which will register with reasonable accuracy the amount of current flowing in the electrical circuit, or, through the meter.

My invention will best be understood by reference to the annexed drawing in which Figure 1 is a view of the back of the working mechanism of the meter entirely removed from the casing.

Figure 2 is a side view of Fig. 1.

Figure 3 is another side view of Fig. 1 looking from the bottom thereof, while

Figure 4 is an enlarged section on the lines 4—4 of Fig. 1.

Figure 5 is a plan view on an enlarged scale of the complete moving element.

Figure 6, is a view similar to Figure 2, without the moving element, showing a modified method of making connection to the ammeter.

Figure 7 is a fragmentary view of the left hand side of Figure 4, but showing an eyelet in place of the rivet for holding certain of the parts together.

From the drawings it will be seen that all of the working parts of the meter are built into a unitary structure which includes a dial 1 on the face of which the usual scale divisions and numbers are placed. On the back of the dial, shown in Fig. 1, is fastened, by any satisfactory means, a housing 2. As illustrated in the drawing, the housing 2 is attached to the dial 1 by rivets 3. Within the housing 1 is carried a bar magnet 4 shown in outline by the dotted line 18, Fig. 1, one face of which is positioned against the dial 1. The housing 2 is preferably of conducting yet non-magnetic material, such as brass, and is provided with a seat or depression 5, within which is positioned a pivot or projection extending from the armature or movable element 6. As is more clearly seen in Figure 2, the armature 6 has a finger 7 bent upward and has a part punched outwardly therefrom forming a pivot point 8. The pivot point 8 engages a depression or seat in the arm 9 which is preferably formed integral from the central portion of the housing 2. The finger 7 is provided with a pair of clips 10 used for clamping the end of a pointer 11 that cooperates with the scale marked on the dial to indicate the current going through the meter.

Extending from each end of the housing 2, and preferably formed integral therewith, is a pair of arms 12 and 13. On the outer end of these arms is carried a pair of current connecting studs 14 and 15. In order to space and position these studs 14 and 15, I use a bar 16, preferably of good insulating material.

As shown in Fig. 2 the ends of the members 12 and 13 are bent over at 17 to engage with flat sides on the studs 14 and 15 to prevent them from turning as nuts and terminals are attached to the meter.

As will be readily seen, current through this meter passes, for example, from the stud 14 to the arm 12, through the housing 2 and magnet 4 as well as through the dial itself to the arm 13 and the stud 15. The magnetic field, set up by the passage of current, as above indicated, produces a magnetic flux, which acts with the normal magnetic flux of the bar magnet 4 producing a resultant flux which actuates the armature 6 thereby giving the readings on the scale of the dial. The parts assembled, as shown in the drawings, constitutes a complete meter without any casing, which, for the purpose of clarity, has not been shown.

From Fig. 5, it will be observed that the complete moving element comprises only two parts, an armature 6 having the bent over finger 7 and the pointer 11 held to the finger 7 by the clips 10. The construction and arrangement of these parts is such that the armature is counter-balanced on either side of the horizontal and vertical plane passing through the pivots. It will also be observed that the construction is such that the moving element may be quickly put into position and the necessary pressure on the pivot points may be quickly adjusted by merely bending either the arm 9 or the finger 7, or both. This construction of the moving element is such that it may be utilized in other types of meters than the one herein described.

While I have indicated screw threaded studs for making connections to the meter, other connecting devices may be used such as quick detachable clips as shown in Figure 6, wherein the arm 12 has attached to it, a member 19 passing through the insulator 16 and which has its outer end bent to form a resilient finger 21, having a hole 24 at the end thereof. The member 19 has a lug 20 thrown outward and a hole 23 therein, which hole is in substantial alignment with the hole 22 in the member 19. The parts 12 and 19 may be fastened together in any satisfactory manner, as by clips 25. When it is desired to make connection to the ammeter, the finger 21 is pushed downward until the holes 22, 23 and 24 are in alignment, whereby the conductor may be inserted through these holes and on releasing pressure from the member 21, the conductor is gripped.

The reason for using the studs 14 and 15 and positioning bar 16 is to make the terminal connections to the ammeter correspond to present practise wherein the connecting studs are arranged on a diameter of the meter; however, the construction herein described is such that in place of the rivets 3, eyelets 26 as shown in Figure 7 may be used and connecting studs may be passed directly through these eyelets, or, other connecting studs to take the place directly of the rivets, in which latter two constructions it will be observed that no insulation whatever is utilized in the construction of the ammeter, and in this respect I believe the construction is entirely unique.

Other changes than those herein specifically pointed out may be made without departing from the spirit of my invention or the scope of the appended claims.

Having thus described my invention what I claim is:

1. An electrical measuring instrument including a unitary structure comprising, a dial, a magnet, a metal housing for the magnet substantially of the size of the magnet and fastened to the dial, said dial lying against one face of the magnet and acting as a closure for the housing, an arm projecting laterally from the housing then upwardly and inwardly over the housing and a movable element pivoted between a part of the housing and the end of said arm, said movable element having at least a pointer and a member effected by magnet lines of force.

2. An electrical measuring instrument including a unitary structure comprising; a dial, a non-magnetic metal housing fastened to the dial, a magnet carried within said housing, said housing having an arm at each end extending toward the central part of the dial, current carrying studs connected to said arms, a centrally disposed arm projecting upwardly from and over said housing, a movable magnetic element pivoted between the top of said housing and the end of said centrally disposed arms and a pointer carried by said movable member.

3. A measuring instrument for an electrical circuit comprising; a dial and a bar magnet carried by the dial so the face of the magnet lies against the dial, a movable magnetic element mounted adjacent the magnet and means for causing the current to pass through at least a part of the dial as well as the magnet.

4. A measuring instrument for an electrical circuit comprising; a dial, a metal housing fastened to the dial, a bar magnet held within said housing, a pair of terminal arms extending from the ends of the housing toward the horizontal central axis of the instrument, current terminals connected to said arms, a centrally located arm extending over the top of said housing and an armature having pivoting means formed integrally therewith and pivoted between the end of said last mentioned arm and the top of said housing and adapted to be acted on by the flux from said magnet as well as the flux set up by the passage of current from one of said current terminals to the other.

5. A measuring instrument for an electrical circuit comprising; a dial, a bar magnet having one face lying against the dial, a metallic housing substantially of the same size as the magnet and embracing the magnet, and fastened to the dial, circuit terminals in electrical contact with opposite ends of the housing and magnet, an armature mounted on the exterior of the housing and over the magnet and a pointer cooperating with the armature and dial to indicate the amount of current when current is passing from one circuit terminal to the other.

6. A measuring instrument for an electrical circuit comprising; a dial, a magnet, a non-magnetic metallic housing holding the magnet against the dial, means for completing an electrical current circuit through at least the housing and the magnet, an arm extending laterally from the housing, then upwardly and inwardly over the top of said housing, an armature lying closely adjacent to the top of said housing and having a pivot point therein and having a finger bent to extend under said arm and having a pivot point therein and a pointer carried by the armature cooperating with the dial to indicate the flow of current through said electrical circuit.

7. An ammeter comprising, a dial, a bar magnet, a punched housing substantially the size of the magnet for holding the magnet against the dial, an armature structure having pivot means formed integrally therewith and pivoted adjacent the magnet between parts of the magnet holding means, a pointer carried by the armature structure and means for passing at least a part of the current to be measured through the bar magnet, housing and dial thereby producing a resultant flux for actuating said armature.

8. An electrical measuring instrument including a unitary structure comprising; a dial, a non-magnetic metal housing fastened to the dial, a magnet carried within said housing, said housing having an arm at each end extending toward the horizontal axis of the dial, current carrying studs connected to said arms, a spacing and positioning bar of insulating material connected across said studs, a centrally disposed integral arm projecting from said housing and over the top thereof, an armature of magnetic material having an integral pivot positioned in a seat in said housing and also having a finger bent over under said arm and pivoted therein and a pointer attached to said finger.

9. An electrical measuring instrument including a movable element consisting of only two pieces, an armature and a pointer with means for attaching them together, said armature having pivotal means formed integrally therewith.

10. An electrical measuring instrument including a movable element consisting of only two pieces, an armature having a finger extending upwardly and over the armature and also having clips thereon and a pointer held to the finger by said clips.

11. An electrical measuring instrument including a movable element consisting of only two pieces, an armature having a finger extending upwardly and over the armature and also having a pointer fastened to said finger.

12. An electrical measuring instrument including a movable element consisting of only two pieces, an armature of magnetic material having an integral projection acting as one pivot, a finger bent upwardly and inwardly over the armature, said finger having an integral projection at its free end acting as the other pivot and a pointer fastened to said finger.

13. An electrical measuring instrument including a movable element consisting of only two pieces, an armature of magnetic material having an integral projection acting as one pivot, a finger bent upwardly and inwardly over the armature, said finger having an integral projection at its free end acting as the other pivot and an aluminum pointer fastened to said finger, said armature finger and pointer being arranged so the parts counter-balance each other on either side, of a vertical plane longitudinal of the armature and passing through the pivots as well as on opposite sides of a plane at right angles to the first mentioned plane.

14. An ammeter comprising a bar magnet, means for mounting the same comprising; a punched housing of substantially the same dimensions as the magnet and a dial carrying the housing and closing the opening therein, an armature structure pivoted between integral parts of the housing, a pointer carried by the armature structure and means for passing current through the magnet, the housing and a part of the dial.

15. An electrical measuring instrument including a unitary structure comprising; a dial, a nonmagnetic metal housing fastened to the dial, a magnet carried within said housing, said housing having spaced arms extending toward the central horizontal axis of the dial, current carrying studs connected to said arms, a spacing and positioning bar connected across said studs but insulated therefrom, a centrally disposed arm projecting from said housing and over the top thereof, an armature of magnetic material pivoted between the end of said arm and said housing, and a pointer operatively carried by said armature.

16. An electrical measuring instrument including a movable element consisting of an armature and a pointer, said armature having pivotal means formed integrally therewith.

In testimony whereof, I affix my signature.

CARL T. MASON.